United States Patent
Pantel et al.

(10) Patent No.: US 9,767,144 B2
(45) Date of Patent: Sep. 19, 2017

(54) SEARCH SYSTEM WITH QUERY REFINEMENT

(75) Inventors: Patrick Pantel, Bellevue, WA (US); Michael Gamon, Seattle, WA (US); Hassan Sajjad, Stuttgart (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 13/452,720

(22) Filed: Apr. 20, 2012

(65) Prior Publication Data
US 2013/0282704 A1 Oct. 24, 2013

(51) Int. Cl.
*G06F 17/30* (2006.01)
*G06F 17/00* (2006.01)

(52) U.S. Cl.
CPC .. *G06F 17/30395* (2013.01); *G06F 17/30867* (2013.01)

(58) Field of Classification Search
CPC .............. G06F 17/30395; G06F 17/30867
See application file for complete search history.

(56) References Cited

U.S. PATENT DOCUMENTS

| | | |
|---|---|---|
| 6,578,022 B1 | 6/2003 | Foulger et al. |
| 6,941,297 B2 | 9/2005 | Carmel et al. |
| 6,947,930 B2 | 9/2005 | Anick et al. |
| 7,096,218 B2 | 8/2006 | Schirmer et al. |
| 7,516,124 B2 | 4/2009 | Kasperski |
| 7,792,821 B2 | 9/2010 | Shakib et al. |
| 2003/0217052 A1 | 11/2003 | Rubenczyk et al. |
| 2005/0055341 A1 | 3/2005 | Haahr et al. |
| 2006/0010126 A1 | 1/2006 | Anick et al. |
| 2006/0142993 A1* | 6/2006 | Menendez-Pidal et al. ..... 704/9 |
| 2008/0005075 A1 | 1/2008 | Horvitz et al. |
| 2008/0133504 A1 | 6/2008 | Messer et al. |
| 2008/0243784 A1 | 10/2008 | Stading |
| 2008/0243786 A1 | 10/2008 | Stading |
| 2008/0281581 A1* | 11/2008 | Henshaw et al. ................ 704/9 |

(Continued)

OTHER PUBLICATIONS

Reynolds, et al., "A Query Refinement Model for Exploratory Semantic Search", In Technical Report HPL-2009-167, HP Laboratories, 2009, pp. 1-16.

(Continued)

*Primary Examiner* — Alexey Shmatov
(74) *Attorney, Agent, or Firm* — Lyon & Harr, LLP; Mark A. Watson (57) ABSTRACT

A search system that automatically generates questions to refine an underspecified query. The system may generate questions even for queries against a database that contains unstructured textual descriptions of items, allowing the system to operate on a database of items that can be constructed inexpensively. The system extracts from the unstructured text combinations of words that may serve as a set of attribute values. The system uses a classifier to filter out attribute values from the set that would generate unanswerable questions. The remaining attribute values are ranked on their ability to narrow the search results and the highest ranking attribute value is used to generate a question to the user who submitted the query. The response to the question narrows the search results, and the process can be repeated iteratively until the search results are sufficiently narrow.

17 Claims, 6 Drawing Sheets

(56) References Cited

U.S. PATENT DOCUMENTS

| | | | | |
|---|---|---|---|---|
| 2009/0024402 A1* | 1/2009 | Delingat | ........... | G06F 17/30389 705/310 |
| 2010/0312724 A1* | 12/2010 | Pinckney | ............. | G06N 99/005 706/11 |
| 2011/0145230 A1* | 6/2011 | Eskey | ................ | G06Q 30/0201 707/728 |
| 2015/0178408 A1* | 6/2015 | Garg | ................. | G06F 17/30864 707/765 |

OTHER PUBLICATIONS

Kulshreshtha, Vedant, "Fast ESP: Architecture", Retrieved on: Nov. 15, 2011, Available at: http://blogs.technet.com/b/vedant/archive/2009/03/06/fast-esp-architecture.aspx.

"ZoomInfo Database", Retrieved on: Nov. 15, 2011, Available at: http://www.zoominfo.com/business/overview/database.html?utm_source=bizsite&utm_medium=link&utm_campaign=left-module.

Demidova, Elena, "Usability and Expressiveness in Database Keyword Search: Bridging the Gap", In PhD Workshop at VLDB, Aug. 24, 2009, 6 pages.

Lau, et al., "Patterns of Search: Analyzing and Modeling Web Query Refinement", In Proceedings of the Seventh International Conference on User Modeling, Jun. 1999, pp. 119-128.

Graupmann, et al., "Automatic Query Refinement Using Mined Semantic Relations", In Proceedings of the International Workshop on Challenges in Web Information Retrieval and Integration, Apr. 8, 2005, pp. 205-213.

De Loupy, et al., "Query Expansion and Classification of Retrieved Documents", In Proceedings of the 7th Text Retrieval Conference TREC-7, Nov. 1998.

Buckley et al., "Automatic query expansion using smart : Trec 3", In Proceedings of the third Text Retrieval Conference TREC-3, 1995.

Chu et al., "Techniques for textual document indexing and retrieval knowledge sources and data mining", Information Retrieval and Clustering, 2002, Kluwer Academic Publishers.

Hersh et al., "Words, concepts, or both: optimal indexing units for automated information retrieval", Proceedings of the Annual Symposium on Computer Application in Medical Care, 1992, pp. 644-648.

Kotov et al., "Towards natural question guided search", Proceedings of the 19th international conference on World wide web WWW 10, Apr. 26, 2010, ACM Press.

Ogilvia et al., "The effectiveness of query expansion for distributed information retrieval", In Proceedings ACM-CIKM'2001, 2001, ACM Press.

Quarteroni et al., "Designing an Interactive Open-Domain Question Answering System", Natural Language Engineering, 2008, vol. 1 iss. 1, pp. 1-23, Cambridge University Press, United Kingdom.

Quarteroni, Silvia, "Personalized, interactive question answering on the web", Coling 2008: Proceedings of the workshop on Knowledge and Reasoning for Answering Questions, Aug. 2008, pp. 33-40.

Robertson et al., "Relevance weighting of search terms", Journal of American Society for Information Science, May-Jun. 1976, vol. 27 No. 3, pp. 129-146.

Salton et al., "Improving retrieval performance by relevance feedback", Journal of the American Society for Information Science, 1990, vol. 41 iss. 4, pp. 288-297.

* cited by examiner

SEARCH SYSTEM WITH QUERY REFINEMENT

BACKGROUND

Search systems are widely used in making information available over computer networks, such as the Internet. Some search systems are very general purpose. For example, Internet search systems, such as the BING search system operated by Microsoft, respond to a user request for information by searching many different data sources accessible over the Internet. Other search systems are more focused, searching a more limited set of data sources. For example, a retail store may respond to a user request for information by only searching through data sources with information about its products. Though, even some general purpose search engines, such as BING, are able to search such "verticals" so that the system will respond to a search query identifying a product or other particular item by returning information that relates to instances of that item.

Regardless of the data sources that act as a database that are searched in response to a user query, the amount of information returned in response to a search query may depend on the format of the query submitted. Even for search systems operating on a more limited database of items, a query may be underspecified such that more items in the database match the query than a user desires to review. In some scenarios, the results of a search query may be so extensive that they cannot be easily presented to a user at one time. Though some users in some scenarios prefer to browse through a large result set, many users in many scenarios prefer to have the search system return a single or a small number of highly relevant search results.

In some scenarios, a user, upon receiving a large number of results in response to a query, may provide additional information to the search system to more narrowly define the search query. The refinement may be based on simply adding more qualifiers to the query, such as by adding terms to a search string. Though, some systems are "faceted" to facilitate narrowing a search query.

In a faceted search system, a search is conducted in a database in which attributes about the items have been predefined. Values for the attributes may be specified for each item in the database. To narrow a search, the user may be presented with options on a user interface to limit the search results to only those items having a specific value, or range of values, for an attribute.

SUMMARY

A search system provides useful results to a user in response to an underspecified query by engaging in a dialog with the user. Questions for the dialog may be generated automatically and may be generated using techniques to efficiently arrive at a result set of appropriate size. The system may search for items matching the query in a database of items. The items may be associated with descriptive text, which may be processed to generate the questions. The system may employ techniques for automatic question generation even when the descriptive material is in the form of unstructured text.

Accordingly, in one aspect, the invention relates to a method of operating a search system that includes receiving a user query and, based on the query, identifying from a corpus of data a result set comprising information about a plurality of items. A value of an attribute is then selected from a set of attribute values characterizing assets in the corpus. That selection may be based on a ranking of attribute values in the set of attribute values, the ranking being based on a degree of discrimination among items in the result set that results from qualifying inclusion in the result set based on the selected attribute value.

In another aspect, the invention relates to a computerized apparatus that includes a database comprising data about a plurality of items, at least one computer storage medium comprising a plurality of attribute values, a network interface and at least one processor. The processor is adapted to receive a query through the network interface and select, based on the query, a result set comprising a subset of the plurality of items in the database. An attribute value may be selected from the plurality of attribute values and used to generate a question. That question may be transmitted through the network interface and a response may be received. The response may be used in updating the response set.

In yet a further aspect, the invention may relate to at least one computer-readable storage medium comprising computer-executable instructions that, when executed, perform of method of operating a search system that, in response to a user query, provides an output based on an identification of one or more items. That method may comprise acquiring textual descriptions of a plurality of items and identifying combinations of one or more words appearing in the textual descriptions. These combinations of words may be classified into a plurality of categories. A set of attribute values may be determined from the identified combinations of words and respective categories of the words. This set of attribute values may be used to generate questions that refine the user query.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that a low cost, yet effective, search system may be created by automatically generating questions for query refinement, even if the query is run against a database that describes items using unstructured text. The questions may be generated such that the system quickly arrives at an appropriate number of items identified in response to the query.

Such a system may be constructed without the effort of constructing a faceted database. In some embodiments, the database may be constructed using textual descriptions about items. Those textual descriptions may be unstructured and may even be harvested from text generated for reasons other than constructing the search system. For example, if the system is to provide data about products for sale, the descriptions may be based on user evaluations of the products or postings on a social networking site. Accordingly, these and other crowd sourcing techniques may be used to construct the database.

Regardless of how the unstructured text is obtained, that text may be processed to identify attribute values characterizing items in the database. These combinations may be identified in an automated way. For example, attribute values may be identified based on one or more words that appear in unstructured text associated with multiple items in the database. In some embodiments, a useful attribute value may be identified based on computation of a metric reflecting a quantity of information about items in the database revealed by that attribute value.

Identifying useful attribute values may be performed in one or more processing steps that add or remove as candidate attribute values strings of one or more words appearing in the textual descriptions associated with items in the database. In some embodiments, for example, a first processing step may be used to identify combinations of one or more words that have a high pointwise mutual information content. Such strings of words may serve as candidate attribute values. In a separate processing step, candidate attribute values that, if used to form a question for query refinement, would generate little or no useful information for narrowing the search results may be excluded.

Regardless of the how identified, when a question is to be generated for query refinement, one or more attribute values may be selected from the set of candidates. A selected attribute value may be the basis for a question generated to a user in response to an underspecified query.

The question may be generated in any suitable way, such as by populating a template based on the selected attribute value. Though not a requirement of the invention, the question may be a binary question, asking the user whether the user is searching for information about items having a specific value of an attribute. Though, it should be appreciated that the questions may be in any suitable format, including in a format that requests a user to supply a value of an attribute or to select from among multiple attribute values.

Any suitable technique may be used to select one or more appropriate attribute values. In some embodiments, an attribute value may be selected based on the result set. For example, an attribute value may be selected based on a degree to which an answer to a question formulated based on the attribute value will narrow the result set. For binary questions, the attribute value that most nearly reduces the result set by half may be selected. For other types of questions, other criteria may be used to select one or more attribute values as the basis for a question.

Regardless of how the questions is constructed, a result to the question may be used to update the set of results generated by the query. If the updated result set still contains more items than desired, a further iteration may be performed. In each subsequent iteration, another question may be generated, and, based on the response, the result set may again be updated.

Though embodiments of a search system may be suitable for many operating environments, such a search system may be well suited for mobile devices. Mobile devices tend to have small displays, such that the amount of information that can be displayed in response to a search query is limited. Mobile devices may also have limited user input capabilities such that being able to narrow a search query by presenting simple questions to the user and receiving simples response may provide a desirable user experience. As yet another example, in some embodiments, the user interface may be presented through augmented reality glasses where the glasses act like a personal assistant (an extension of what phones can do today).

Figure 1:
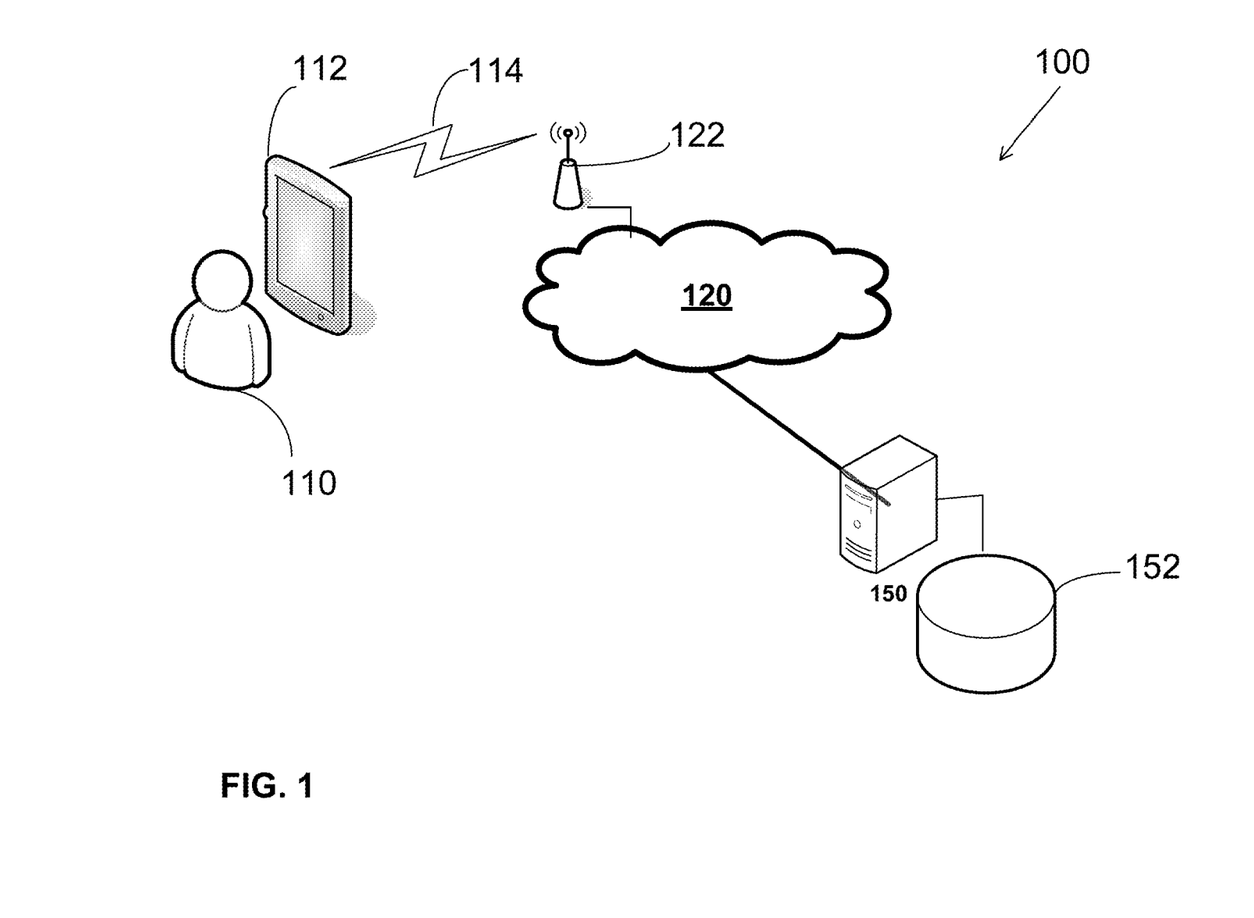
FIG. 1 is a sketch of an exemplary embodiment of a search system in a scenario in which a user is accessing the system to obtain information in response to a query.

Such a search system may be implemented in any suitable way and used in any suitable environment. FIG. 1 illustrates an exemplary search system 100 in which techniques for query refinement as described herein may be applied. In the scenario illustrated in FIG. 1, a user 110 is accessing search system 100 through a portable computing device 112. The portable computing device, for example, may be a tablet computer or a smart phone. Though, the specific device through which a user accesses search system 100 is not critical to the invention, and any suitable computing device may be used for access.

As is known in the art, portable computing device 112 may provide a user interface through which user 110 may input a query. That query may be communicated to server 150, which may be programmed to search for and return to computing device 112 information defined by the query. Such a query may be specified in any suitable format and communicated from portable computing device 112 to server 150 in any suitable way. For example, computing device 112 may be equipped with a browser of the type conventionally used to present a user interface to a server based system. User input entered through the browser may be communicated to server 150.

In this scenario, communications between computing device 112 and server 150 occur over network 120 and wireless link 114. In this example, a network 120 may be the Internet and server 150 may be connected to network 120 through any suitable network interface. Wireless link 114 may be a network formed over a wide area network, such as cellular network coupled to network 120 via a base station 122. The specific network connections between computing device 112 and server 150 are not critical to the invention. However, search system 100 may be configured to allow a favorable user experience when a wireless link, which may limit the bandwidth of communications between computing device 112 and server 150, is used for communication. Techniques as described herein may allow meaningful search results to be identified while limiting the amount of information exchanged between computing device 112 and server 150.

An approach for limiting the amount of information exchanged may employ query refinement. In response to a query, which may be submitted in any suitable form, server 150 may execute that query against information stored in database 152. That search may be conducted in any suitable way, including using a search engine or other search functionality as is known in the art. Though, queries specified using conventional search systems are frequently under constrained. As a result, when a search engine within server 150 executes the query in a known way, the result set may contain more information than is desired by user 110. Rather than transmit the full result set, server 150 may automatically generate questions to engage in a dialogue with user 110 to update the result set, thereby reducing the number of items in the updated result set. Techniques as described herein may be used to generate questions that quickly narrow the result set.

Database 152 may contain any suitable type of information. In some embodiments, database 152 may contain information about items and unstructured textual descriptions of those items. As one example, the items in database 152 may be items for sale at a retail store. Though, it should be appreciated that the invention is not limited based on the nature of items in database 152. The items, for example, may be movies, restaurants or anything else about which a user might desire to search for information.

Regardless of the nature of the items in database 152, server 150 may be programmed to access descriptive information about those items and generate questions for a query refinement dialogue. The generated questions may be communicated to portable computing device 112, where they are presented to the user 110. The questions may be presented in any suitable way. In the embodiment illustrated, portable computing device 112 has a display on which information may be presented to user 110. The questions may be in a textual or graphical format amenable to display on computing device 112. In response to such a display, user 110 may provide input that allows server 152 to update the set of results generated in response to the query by eliminating some items from the result set.

Though, it should be appreciated that the mechanism by which questions are presented to the user and the user provides additional information is not critical to the invention. In some embodiments, for example, questions may be presented in an audible format and user responses may be captured using speech to text or other approaches for receiving user input.

Figure 2:
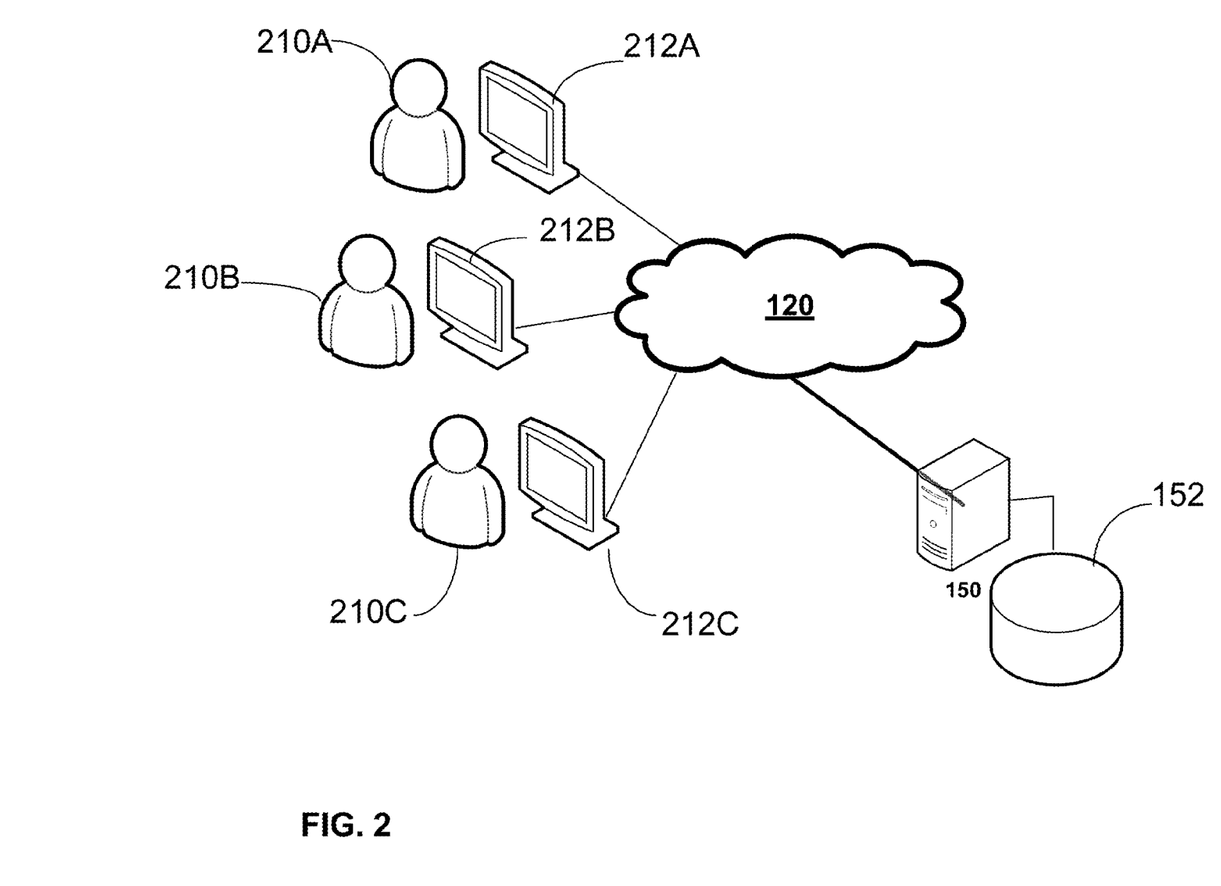
FIG. 2 is a sketch of an exemplary embodiment of a search system in a scenario in which descriptive text is being acquired from multiple users.

In the embodiment illustrated, server 150 may generate questions for query refinement based on information stored in database 152 and/or other information. That information may be obtained in any suitable way. Though, in some embodiments, information about items in database 152 may be collected using crowd source techniques. In crowd sourcing, input is collected from multiple individuals. FIG. 2, for example, shows multiple users 210A, 210B and 210C. Each of the users may interact with each other and/or computerized systems accessible over the Internet 120. In the illustrated example, each of the users 210A, 210B and 210C interacts through a computing device 212A, 212B, 212C, respectively. In this example, the computing devices are illustrated as desktop computers, but the specific mechanism of access is not critical to the invention.

The specific nature of interaction that generates descriptive information about items in database 152 also is not critical to the invention. In some embodiments, each of the users 210A, 210B and 210C may log on to a website presented by server 150 and input information specifically about items in database 152. Though, the descriptive information about items database 152 may be obtained based on user interactions for reasons other than providing descriptions of items in database 152. For example, the user interactions may entail inputs to a social networking system in which users express preferences or provide ratings about items. Server 150, or any other suitable computing device, may access this information to associate descriptive text with items in database 152.

Figure 3:
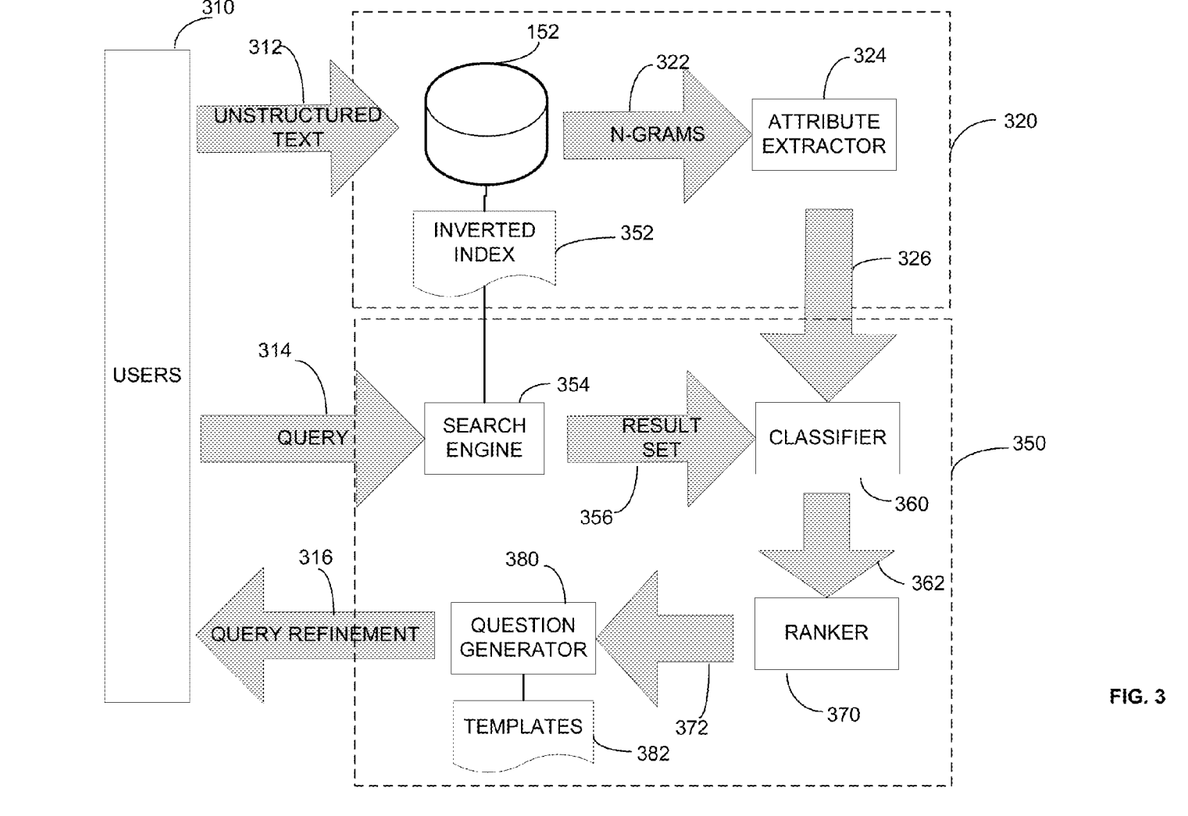
FIG. 3 is a functional block diagram illustrating operation of an exemplary embodiment of a search system.

FIG. 3 illustrates, in a functional way, components that may perform operations of a search system, such as search system 100 (FIG. 1). FIG. 3 illustrates that users 310 interact with the search system. Users 310 may include users, such as user 110 (FIG. 1) who submit search queries to the system. Users 310 also may include users, such as users 210A, 210B and 210C (FIG. 2) who provide textual descriptions. Such users, interacting with the search system in different ways, may be the same individuals or may be different individuals who interact with the search system in different ways at different times.

In the example of FIG. 3, an off-line process 320 and an online process 350 are illustrated. During off-line process 320, the search system may be configured to respond to a query from a user. Configuration may entail receiving textual descriptions about items in a database 152 to be searched in response to a query. Alternatively or additionally, configuration may entail preprocessing of the textual descriptions to prepare for responding to a search query during online process 350.

In off-line process 320, the system receives unstructured text 312. As described above, this unstructured text may be directly input into the search system or may be gathered from other types of user actions. Regardless of the manner in which the unstructured text 312 is obtained, it may be stored in database 152. Any suitable storage format may be used. Though, in the embodiment illustrated, unstructured text 312 is stored in a way that there is an association between items in the database and unstructured text that describes those items.

Additionally, an index of the information in database 152 may be created during off-line process 320. In the embodiment of FIG. 3, an inverted index 352 is created for database 152 associating strings and information from the unstructured text and database record to database records. Inverted index 352 may be an index of the type known in the art for use by a search system. Such an index may be created in any suitable way, including using techniques as are known in the art for building an index for a search system. In some embodiments, for example, the inverted index points words into records in database 152 associated with unstructured text that matches the words.

In addition to obtaining unstructured text during off-line process 320, that unstructured text may be preprocessed to identify candidate attribute values for use in online process 352 to generate questions. The attribute values may characterize items in database 152.

In the embodiment illustrated in FIG. 3, candidate attribute values are identified by processing n-grams identified in the text stored in database 152 to describe the items in that database. An n-gram may be a string of one or more words. The words in the string may occur sequentially in the descriptive text, but this is not a requirement. For example, articles such as "a" or "an" may be skipped over in forming strings. Similarly, any other words, deemed not likely to provide information about an item, may be skipped over.

In some embodiments, the size of n-grams processed may be limited. These limits may be derived in any suitable way, and may serve to limit the amount of processing performed on textual descriptions in database 152 by processing only n-grams likely to represent values of attributes characterizing items in database 152. In some embodiments, the n-grams processed may be limited to series of words of length one, two or three. Though, the specific limits imposed are not critical to the invention, as any suitable limits may be used.

In the embodiment illustrated in FIG. 3, the identified n-grams 322 may be provided to attribute extractor 324. Attribute extractor 324 may perform a computation on the identified n-grams to identify a set of candidate attribute values 326. Attribute extractor 324 may be implemented in any suitable way, including by programming server 150

(FIG. 1) or any other suitable computing device. The computation performed by attribute extractor 324 may generate an indication of the amount of information on an n-gram provides about one or more items in database 152. Those n-grams providing more information about items may be preferentially selected as values of attributes characterizing items in database 152.

Any suitable computation may be performed to generate an indication of the amount of information conveyed by an n-gram. In some embodiments, the computation may generate a metric indicating the amount of association an n-gram has with an associated database category. For example, that computation may generate a metric derived from a statistics such as the pointwise mutual information (PMI) or log-likelihood.

As a specific example, if an attribute value, such as the sleeve length of a shirt, is salient to a category, then strings serving as a value of the value, such as "short-sleeved" and "short sleeves", are likely to occur more often in descriptions for items of the category than for other items. Therefore, an approach for selecting candidate attribute values is to seek n-grams that are highly associated with each category, where association can be measured using statistics such as pointwise mutual information (PMI) or log-likelihood. When PMI is used, given an n-gram n∈S, an association of an n-gram with a category c can be computed as:

$$PMI(n; c) = \log \frac{p(n, c)}{p(n)p(c)}$$

where P(n,c) is the probability that an n-gram in a description of an item in c is n, P(n) is the probability that an n-gram in any description is n and P(c) is the probability of any n-gram occurring in a description in class c. N-grams with a PMI score higher than a predetermined threshold with a category are selected as candidate attribute values for that category.

Based on these metrics, one or more n-grams may be selected. The specific approach used to select an n-gram is not critical to the invention. For example, n-grams having a value of the metric exceeding a predetermined threshold or the highest ranking n-grams may be selected as the values for candidate attribute values 326. Regardless of how selected, these candidate attribute values 326 may be stored for use in online process 350.

Regardless of the specific processing that occurs in offline process 320, once the system is configured, online process 350 may be performed. As part of online process 350, a query 314 may be received from users 310 and processed. The query 314 may be supplied by a single user or a combination of users, as the invention is not limited based on the source of the query.

The invention also is not limited by the nature of the query. However, in some embodiments, the query may be a string of search terms that is processed by search engine 354. Search engine 354 may access inverted index 352 to identify items in database 152 matching the query. This processing may be performed in any suitable way, including using search techniques as are known in the art.

As one example, inverted index 352 may map each n-gram n in the set, S, of textual descriptions in database 152 to its corresponding asset r along with its tf-idf, defined as:

$$tfidf(n,r) = tf(n,r) \times \log idf(n)$$

where tf(n,r) is the frequency of n in $S_r$, and idf(n) is the fraction of textual descriptions s∈S containing n.

Let r be a vector of all n-grams in $S_r$, where the value of each n-grams is its tf-idf with r. Then, given a query q, we form a query vector q consisting of all n-grams in q, where the value of each feature is 1. Search engine 354 may first retrieve from the inverted index 352 all items matching an n-grams with q. For each matching item r, we then compute a simple IR rank score as the cosine of the angle between q and r:

$$cosine(q, r) = \frac{\sum_i q_i \cdot r_i}{\sqrt{\sum_i q_i^2 \cdot \sum_i r_i^2}}$$

Such processing may generate a result set 356. Result set 356 may contain information identifying one or more of the items in database 152. In many scenarios, the initial result set 356 may contain multiple items. If result set 356 contains multiple items, the result set may also be referred to as a "confusion set," indicating that the search results still allow for confusion as to the item that is the target of the search. A confusion set may be generated by an "underspecified query," which is a query that results in one or more possible items.

In scenarios in which a user desires a relatively focused result, but submits an underspecified query, result set 356 may initially contain more items than desired. In that scenario, further processing may be performed in online process 352 to update the result set to contain fewer items. That processing may entail identifying appropriate questions and rendering those questions to prompt additional input from the user submitting a query 314 to further focus the search.

In the embodiment illustrated in FIG. 3, appropriate questions are generated by first selecting an attribute value from the candidate attribute values 326. In FIG. 3, a two-step process is used to select an appropriate attribute value. The first such step is performed in classifier 360 and the second step is performed in ranker 370. Classifier 360 and ranker 370 may be implemented in any suitable way, including through programming of the server 150 or other suitable computing device.

In this example, classifier 360 implements processing that divides the candidate attribute values 326 into categories based on their suitability for use in generating questions to narrow search query 314. In the specific example illustrated in FIG. 3, candidate attribute values 326 classifier 360 may divide candidate attribute values 326 into two categories, generally containing useful or not useful candidate attribute values. An attribute value may not be useful in generating questions if, for example, a user would be unable to answer the question and/or, if the user were able to answer the question, the answer would not provide useful information in narrowing a result set. The not useful attribute values may be filtered out.

Classifier 360 may be generated in any suitable way. For example, classifier 360 may be constructed in accordance with a machine learning algorithm as is known in the art. In accordance with some embodiments, a machine learned model utilizes features derived from both the user's query and the candidate attribute values 326, and filters out candidate attribute values that lead to unanswerable questions or are not relevant given the query.

The model may be a Maximum Entropy classifier. Such a classifier may operate according to a supervised classification approach that is based on a training set. The training set may contain queries. For every query in the training set, the query may be applied to search engine 354 to generate a training result set consisted of results along with candidate attribute values each annotated, possibly manually, as useful or not useful. From this training result set, attribute values may be selected from the candidate attribute values 326 generated by attribute extractor 324. The selected attribute values also match at least one description of the items in the training result set: an attribute value candidate that does not fulfil that criterion is by definition not able to serve as a disambiguator on the set. Ranker 370, as described below, may be used to select candidate attribute values for every query in the training set. In the described embodiment, two candidate attribute values are selected and annotated with nine automatically extracted features.

Exemplary features that may be automatically extracted are summarized in Table 1. Though, it should be appreciated that any suitable features alternatively or additionally may be used. In this example, the unigram feature indicates that the candidate term is a unigram; similarly for bigram and trigram. The feature POS tag sequence of candidate represents the part-of-speech tags of the words in a candidate. POS tag of every word in the candidate indicates all individual POS tags. Information about the relation of the candidate to the query and the category of the queried record is captured using the features candidate is a substring of the query and candidate contains the queried category respectively. Real-valued features for the PMI score and log-likelihood score of the candidates with respect to the category may also be used.

TABLE 1

| Binary features |
|---|
| unigram, |
| bigram, |
| trigram, |
| (Part of Speech) POS tag sequence of candidate, |
| separate POS tag of every word in the candidate, |
| candidate is a substring of the query, |
| candidate contains the queried category |
| Real-valued features |
| PMI score, |
| log-likelihood score |

Such a training set may be derived in any suitable way, including by input from one or more humans during configuration of the search system to label questions as answerable, unanswerable and/or useful or not useful in narrowing a result set. From a set of queries, a set of positive and negative examples may be generated for training. Positive examples are attribute values that are meaningful with respect to the given query and answerable if used in a question, whereas negative examples are either not meaningful or unanswerable. For simplicity, these examples may be referred to as answerable and unanswerable, respectively. Though, it should be appreciated that usefulness of attribute values for narrowing a search query may be measured in any suitable way including by automatically using the attribute to narrow the search and computing the effect.

Some or all attribute value candidates for each query in the training set may be labeled as answerable or unanswerable. Such labeling may be performed by a human or performed in any other suitable way. In order to make the labeling task feasible, however, a label may be provided for less than all attribute value candidates.

Such an approach may still yield desirable results. Consider that the classifier, performs a runtime task of filtering out attribute values from the candidate attribute values 326 provided by attribute extractor 324. It is reasonable, therefore, to pick examples for labeling that are likely to be relevant in that scenario. One such technique for picking examples for labeling is to first form the intersection of (i) the terms in the descriptions of the items in the result set; and (ii) the candidate attribute values 326. This produces a set of attribute value candidates just like the ones that classifier 360 will be exposed to at runtime.

In some embodiments, a focus may be placed on finding answerable training cases, because the negative (unanswerable) cases may be in the majority and hence much easier to come by. Of particular importance are cases that are selected by the Attribute Extractor and highly ranked by the Ranker, i.e. "borderline" candidates. In some embodiments, the top-10 attribute values (selected by the Attribute Extractor) may be collected for a given query and result set as measured by the Ranker (using M_rank as a weight function). From this top-10 set, the top candidate and a random candidate to annotate as answerable or unanswerable may be selected. As a specific example, the resulting training set may consist of 100 data points, 47 answerable and 53 unanswerable. Each training case may be represented as a feature vector using the features listed in Table 1. Though, it should be appreciated that any suitable representation of the training set may be used.

The classifier may be evaluated based on 10-fold cross validation on the training set. As a specific example, a probability threshold greater than 0.7 may be used for the answerable question terms.

Regardless of the manner in which the training set for classifier 360 is created, once the result set 356 is generated, classifier 360 may be trained with that training set. The resulting trained classifier 360 may then be used to filter the candidate attribute values 326. In the embodiment illustrated, those values from candidate attribute values 326 classified as "unanswerable" (which in this embodiment indicates that formulating a question based on the attribute value is unlikely to generate significant information useful in the near or in the result set) are removed from further consideration, leaving filtered attribute values 362.

The filtered attribute values 362 are supplied to ranker 370. Ranker 370 selects from among the candidate attribute values 362, one or more values that are likely to be most effective at reducing the result set if used to formulate a question. Ranker 370 may operate in any suitable way. In some embodiments, ranker 370 may compute a metric of the effectiveness of each of the filtered attribute values 362.

In some embodiments, the metric may indicate the degree to which a particular attribute, if used as a qualifier on the results in the set, will restrict the size of the result set.

In some embodiments, the metric may be skewed to reflect the fact that search engines output results in an order. The function used to compute the metric may be skewed to provide a better score for attributes that restrict the result set by removing results ranked lower in the order established by the search engine.

In the embodiment illustrated, ranker 370 orders the filtered attribute values 362 according to how well each is expected to reduce the size of the confusion set. The top ranking attribute value may be used in formulating a question asked to the user.

In an embodiment in which attribute value questions are binary, the most effective questions will be those that result in dividing the confusion set in half. This would result in an optimal interaction strategy where log m questions are needed to guide a user through a confusion set of size m to arrive at a single item in the result set. The ranking score for an attribute value n and confusion set R, score$_R$(n), may be a real-valued function ranging from zero to one where zero indicates that n will cut the confusion set in half and one indicates that n will leave the confusion set unchanged. More effective questions will have a lower value of this score (Accordingly, it should be appreciated that a "higher" score, indicating a more restrictive term, may not be expressed with a value of the metric that is numerically larger than metric values indicating a less restrictive term). Formally:

$$score_R(n) = 2\left|\frac{\sum_{r \in R} \phi_R(n)f(r)}{\sum_{r \in R} f(r)} - 0.5\right|$$

where score$_R$(n): $\mathbb{R} \to [0,1]$, $f(r)$ represents a weight function associated with each item r in the confusion set, and $\phi_R(n)$ is the number of items in the confusion set that hold the attribute value n (estimated by whether or not at least one textual description mentions n).

If $f(r)=1$, score$_R$(n) is minimized when n cuts the confusion set in half. However, each item in the confusion set has a relevance score assigned by search engine 354. It is therefore reasonable to assume that items at the head of R will be more likely the target item than items at the tail of R. Various definitions of the weight function $f(r)$ may be defined to capture this intuition:

$$f(r) = \begin{cases} M_1: & 1 \\ M_{rank}: & \frac{1}{rank(r)} \\ M_{ir}: & IR(r) \\ M_{dcg}: & \begin{cases} 1 \text{ for } rank(r) = 1 \\ \frac{rank(r)}{\log_2 rank(r)} \text{ otherwise} \end{cases} \end{cases}$$

$M_1$ considers all items in the confusion set equally probable to be the target asset. $M_{rank}$ weighs items according to their rank in R and $M_{ir}$ weighs them according to their cosine with the user query. Similarly, $M_{deg}$ weighs items according to their gain discounted by rank position (similarly to that done in the Discounted Cumulative Gain (DCG) metric used primarily in search engine 354).

The filtered attribute value with the lowest score is selected to form the question. In some embodiments, when multiple ones of the filtered attribute values 362 have the same lowest score, a score computed by attribute extractor 324, as described above, may be used as a tie-breaker.

In some embodiments, a system may be built using $M_{rank}$, $M_1$, $M_{ir}$, and $M_{deg}$ as evaluation metrics.

Regardless of the specific technique used by ranker 370, the resulting attribute value 372 may be passed to question generator 380. Question generator 380 may generate a question based on attribute values 372 in any suitable way. In the embodiment illustrated, question generator 380 may access a set of templates 382. A template selected from set of templates 382 may then be used to generate a question provided back to users 310 as a query refinement 316.

In some embodiments, a template may be selected from set 382 based on the part of speech of the selected attribute value, if the selected attribute value consists of one word. If the selected attribute value consists of multiple words, the series of parts of speech corresponding to those words may be used to select an appropriate template. Table 2 lists various question templates and corresponding sequences of parts of speech for which each question template may be appropriate. Though, it should be appreciated that these templates are exemplary, and many other question forms may be appropriate.

TABLE 2

| Template | POS |
|---|---|
| Should it be | JJ (Cat: NN) |
| Should they be | JJ (Cat: NNS) |
| Do you want | DT JJ NN |
| Do you want (a/an) | JJ NN NN |
| Are these | JJ VB NNS |
| Is it | RB VBN |
| Is it (a/an) | JJ VB NN |
| Does it have | NN NNS |

Regardless of the manner in which the question is generated, the resulting question may be transmitted back to the user who generated query 314 as query refinement 316. An answer to that question may be regarded as defining a refined query from the user. The refined query may be the user's initial query qualified to return as a search result only items having an attribute with the value matching the user's response to the question posed as query refinement 316. This refined query may then generate an updated result set, which may in turn be provided to classifier 360, resulting in an updated set 362 of filtered attribute values. The updated set may then be applied to ranker 370, which may make a further selection of an attribute value that is applied to question generator 380. Question generator 380 may then generate a further question, resulting in further query refinement.

This process may proceed iteratively, until an updated result set is narrowed to contain a desired number of items. The desired number of items may be determined in any suitable way. In some embodiments, the processing may proceed iteratively until a single item remains in the result set. In other embodiments, processing may proceed until the result set contains a number of items below a threshold. The threshold may be determined in any suitable way. In some embodiments, the threshold may be based on the nature of the computing device used by the user submitting the query. The result set, for example, may be reduced until the number of items in the result set may be conveniently displayed on the computing device. Though, it should be appreciated that the specific number of items in the result set need not be determined in advance. For example, the process may accept as an input the size of the refined result set from a user. As another example, questions for refinement may be presented to a user through a user interface that includes a control that a user may select to indicate that the user would prefer to browse the results rather than respond to more questions.

Figure 4:
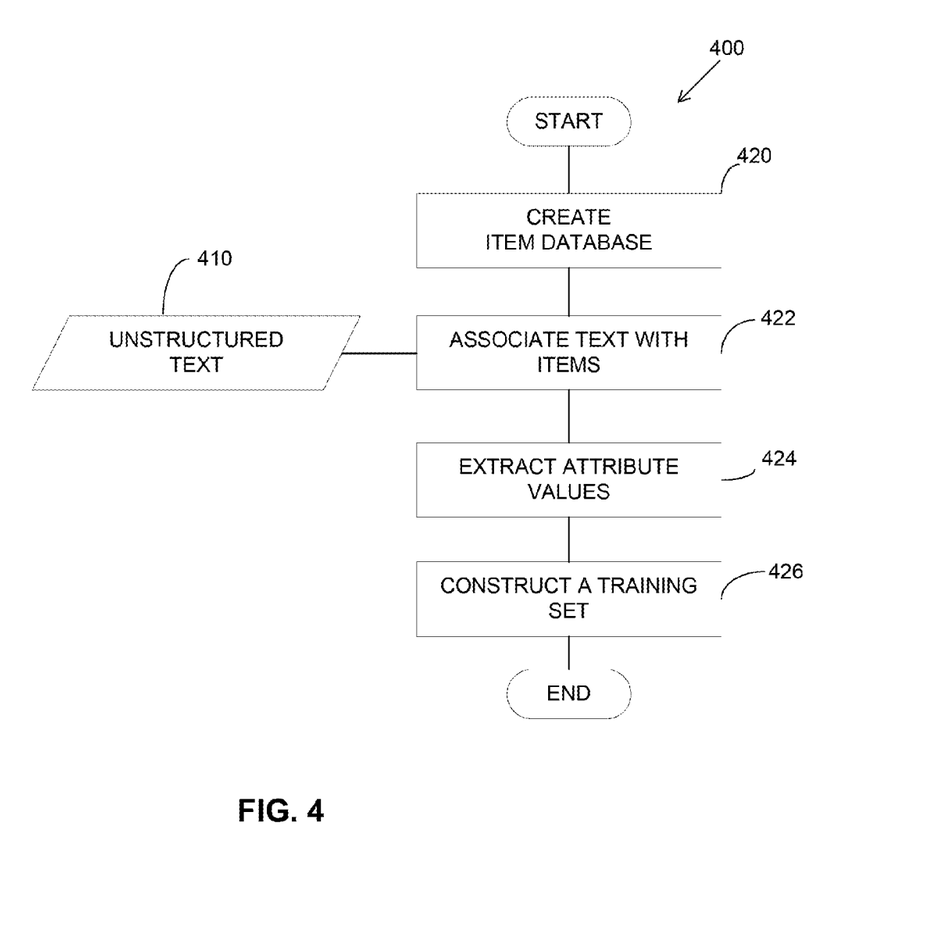
FIG. 4 is a flowchart of an exemplary method of configuring a search system that can generate questions for query refinement from unstructured text.

FIG. 4 illustrates a method 400 of operating a computing system to perform off-line processing. Method 400 may be performed by the same server performing a search in response to a user query. However, because the method 400 may be performed prior to the time that a search query is received, method 400 may be performed in any suitable computing device.

Regardless of the specific device used to perform method 400, the method may begin at block 420. At block 420, an item database may be created. Processing at block 420 may be performed in any suitable way, including importing or accessing a database that already has been created. The specific steps taken to create the item database at block 420 may depend on the nature of the items in the database. For example, in the embodiments in which the search system is to provide information about items for sale in a store, processing at block 420 may entail collecting information from an inventory system or other computer system. In other scenarios, processing at block 420 may entail receiving user input, defining the items in the database. However, because search techniques as described herein may be used for any suitable database of items, the specific processing at block 420 is not critical to the invention.

Regardless of the manner in which the database of items is created, once created, processing may proceed to block 422. At block 422, unstructured text 410 may be received. The unstructured text may be obtained in any suitable way. For example, text may be obtained through direct user input or by mining social networks or other websites containing comments or information about items of the type in the database created at block 420. Unstructured text 410 may be associated with items in the database created at block 420.

Method 400, in this example, then proceeds to block 424 where attribute values are extracted from the unstructured text. Extraction of attribute values may be performed in any suitable way, including using processing as described above in connection with attribute extractor 324. These attribute values may then be retained as a list of candidates to consider for generating questions to refine an under constrained query.

In an embodiment such as is illustrated in FIG. 3 that includes a classifier, method 400 may proceed to block 426. At block 426, a training set may be constructed for the classifier. Processing at block 426 may be formed in any suitable way. In some embodiments, for example, queries issued by users to a conventional search system may be collected and used as the basis for constructing the training set. Various ones of the attribute values extracted at block 424 may be tested for use in formulating questions for query refinements. The narrowing effect of each value may be determined. This processing may be performed in an automated or manual fashion.

Additionally, a question formulated based on the attribute value may also be evaluated to determine whether the question is understandable by a human. This processing may be based on human input. Though, in some embodiments, natural language processing tools may be used to evaluate whether the question is well formed or otherwise complies with rules indicating understandability by a human user.

The assessment of the understandability and narrowing effect of the attribute values may be combined into an overall assessment of the suitability of the attribute values. Based on this assessment, the combination of a query and attribute value may be labeled as either a positive or negative example. Each example may be represented as a feature vector or in any other suitable way.

Figure 5:
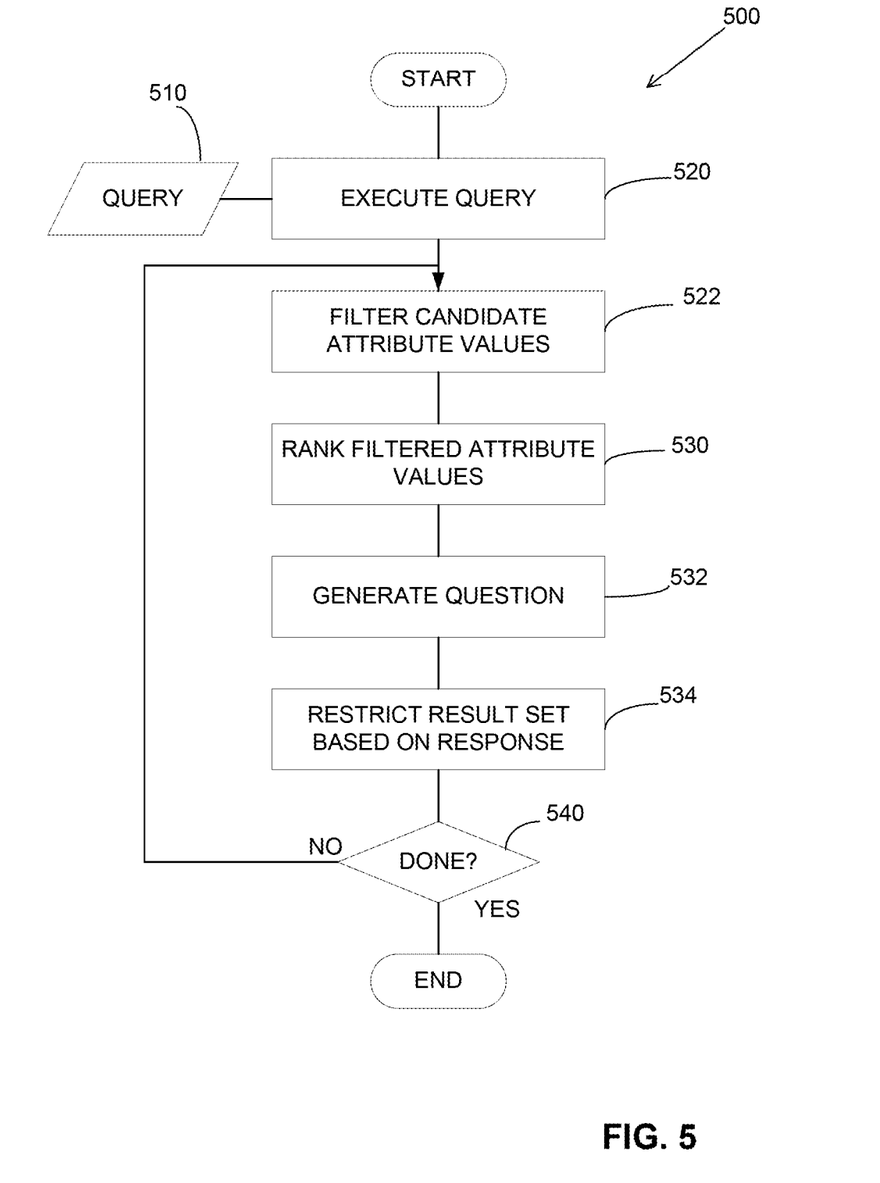
FIG. 5 is a flowchart of an exemplary method of operation of a search system that generates questions for query refinement from unstructured text.

Turning now to FIG. 5, a method 500 for responding to a search query is illustrated. The method 500 may be performed in a server 150 or any other suitable computing device. In this example, the method 500 begins by a query 510 being supplied. Query 510 may be generated from any suitable source, such as user input provided over the Internet.

Regardless of the source of the query, the query may be executed at block 520. Processing at block 520 may be performed in any suitable way, including by operation of a search engine using techniques as are known in the art. The result of executing the query at block 520 may be an initial result set. When the query 510 is under constrained, that initial result set may constitute a confusion set, containing more items then desired. Accordingly, processing may proceed to narrow the search.

At block 522, the candidate attribute values identified at block 424 (FIG. 4) may be filtered to eliminate as candidate attribute values those unlikely to be useful based on the received query 510. Processing at block 522 may be performed in any suitable way, including using a classifier, such as classifier 360 described above in connection with FIG. 3.

Regardless of the manner in which the attribute values are filtered, processing may proceed to block 530 where the filtered attribute values are ranked. The filtered attribute values may be ranked in any suitable way, including using processing as described above in connection with ranker 370 (FIG. 3).

Regardless of the manner in which the filtered attribute values are ranked, processing may proceed to block 532 where an attribute value is selected based on its rank. In the embodiment illustrated, the highest ranking attribute value may be selected. This selected attribute value may be used to generate a question. The question may be generated in any suitable way, including by accessing a set of templates as described above in connection with question generator 380 (FIG. 3).

The question may be formatted to elicit a response indicating at least one attribute value. Processing may then proceed to block 534. Based on a response to the question generated at block 532, the result set generated by initially executing the query may be restricted. Items in the result set that are not described in terms matching the attribute value elicited response to the query may be removed from the result set.

Processing then may proceed to decision block 540. At decision block 540, method 500 may branch, depending on the number of items remaining in the updated result set after it was restricted by processing at block 534. Any suitable criteria may be used to determine whether the result set has been restricted to a sufficiently small number. In some embodiments, the result set may be restricted to a single item. Though, in other embodiments, method 500 may yield a result set containing multiple items.

Regardless of the criteria used at decision block 540, when it is determined that the result set has been suitably restricted, method 500 may end. Upon completion of the method 500, the result set may be output to the user who submitted query 510 or any other suitable processing may be performed with the result set. Conversely, when processing at decision block 540 determines that the result set is larger than desired, processing may loop back from decision block 542 block 522. Processing to identify an attribute value may be repeated, leading to the generation of an additional question at block 532. This iterative process of generating questions and restricting the result set may be repeated until the result set is restricted to a desired level.

Figure 6:
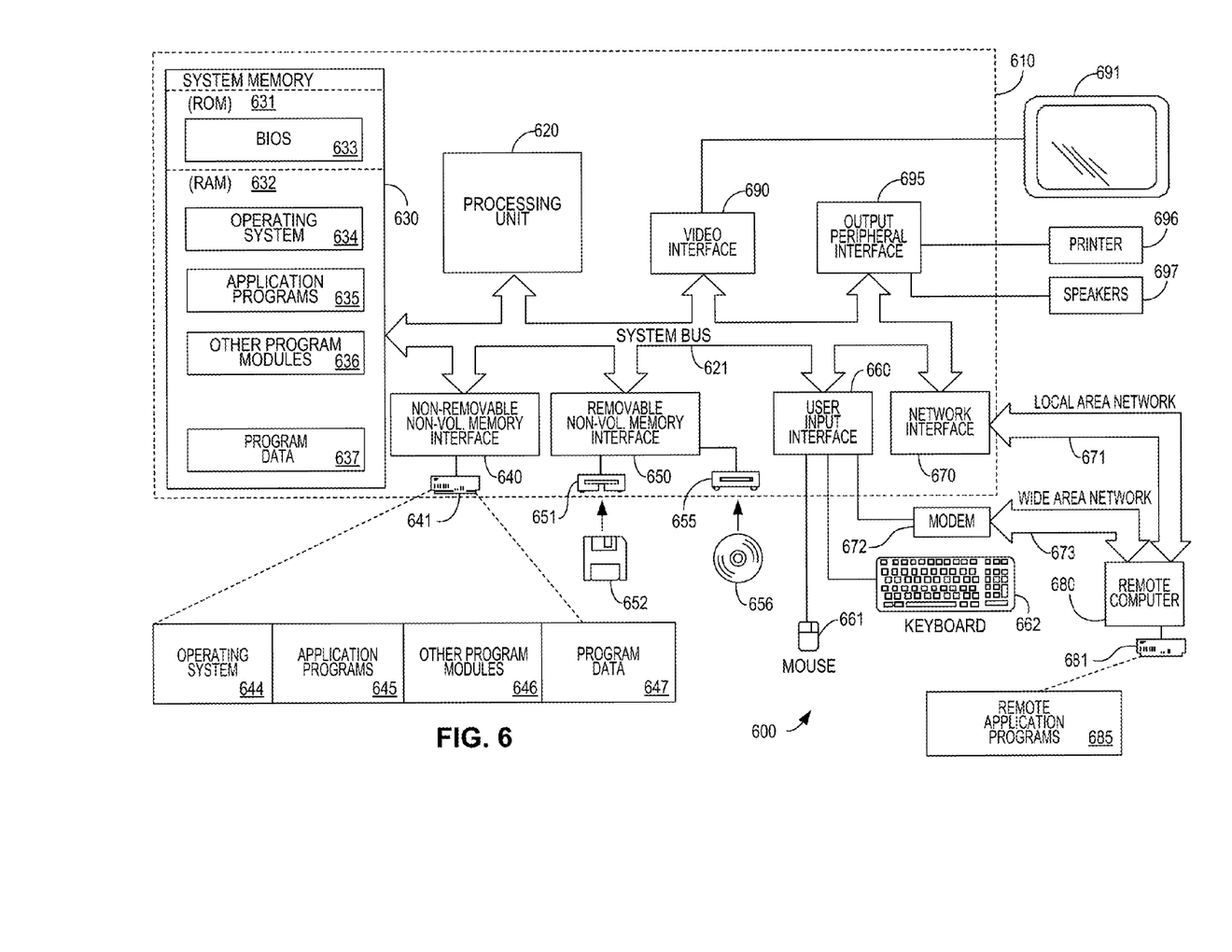
FIG. 6 is a block diagram of an exemplary computing device that may be used in implementing a search system.

The processing functions as described herein may be performed on any suitable computing devices. FIG. 6 illustrates an exemplary computing environment. The computing environment illustrated in FIG. 6 may represent a server

150. Alternatively or additionally, the computing environment illustrated in FIG. 6 may represent a user computing device that may access a search system as described herein.

FIG. 6 illustrates an example of a suitable computing system environment 600 on which aspects of the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, a database with information about items to be searched is said to contain "text" made up of "words." It should be appreciated that the "text" need not be text in the English language or in any specific language. Techniques as described herein may be applied to a database in which words of any type are used to characterize items about which a search may be conducted. In this regard, "words" need not be words as found in a dictionary. They may be, for example, abbreviations or codes. More generally, a "word" may be any symbol that, alone or in combination with other symbols, has the potential for conveying information about an item.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented process for operating a search system, comprising:
   receiving a database comprising a plurality of items;
   for each item, automatically mining a plurality of websites to retrieve a plurality of instances of unstructured user entered textual descriptions corresponding to each item;
   for each item, extracting a plurality of candidate attribute values from the corresponding user entered textual descriptions;
   ranking the candidate attribute values according to how selection of each candidate attribute value will reduce a size of a search result set;
   wherein ranking the candidate attribute values further comprises computing a degree of discrimination for each of a plurality of attribute values, the degree of discrimination for each attribute value corresponding to the number of items that would be excluded from the search result set when the search result set is limited to items having the corresponding attribute value;
   for each item, generating a reduced set of candidate attribute values by applying a classifier to filter out one or more ranked candidate attribute values that are unlikely to reduce the size of the search result set by determining, for each candidate attribute value, whether an answer to a question formulated from each candidate attribute value is likely to reduce the size of the search result set;
   in response to a search query, returning a query result set comprising a subset of items from the database;
   applying a top ranked one of the reduced set of candidate attribute values corresponding to the items of the query result set to automatically formulate and present a question relating to the top ranked candidate attribute value such that any response to that question will reduce a size of the query result set returned in response to the search query; and
   wherein the presented question is a request for a value of an attribute.

2. The computer-implemented process of claim 1, further comprising formulating the presented question such that any response to the question includes information relating to a value of at least one attribute.

3. The computer-implemented process of claim 1, further comprising formulating the presented question in a binary format.

4. The computer-implemented process of claim 1, further comprising updating the query result set based on a response to the presented question.

5. The computer-implemented process of claim 4, further comprising iteratively applying the candidate attribute values corresponding to the items of the updated query result set to formulate and present one or more new questions such that any response to any new question will reduce the size of the updated query result set.

6. The computer-implemented process of claim 1 further comprising a user interface, presented through augmented reality glasses, for receiving the query, presenting the query result set, and responding to the automatically formulated and presented question.

7. The computer-implemented process of claim 1, wherein ranking the candidate attribute values is based on a degree of discrimination among items in the search result set that results from qualifying inclusion in the search result set based on corresponding candidate attribute values and the corresponding unstructured user entered textual descriptions.

8. The computer-implemented process of claim 1, wherein automatically formulating and presenting the question further comprises:
ranking the candidate attribute values according to how selection of each candidate attribute value will reduce the size of the query result set; and
selecting a random one of a subset of top ranked candidate attribute values to formulate the question.

9. The computer-implemented process of claim 1, further comprising a plurality of pre-defined question templates that are applied to formulate the presented question by inserting a selected one of the candidate attribute values into a selected one of those templates.

10. A system, comprising:
a general purpose computing device; and
a computer program comprising program modules executable by the computing device, wherein the computing device is directed by the program modules of the computer program to:
receive a database comprising a plurality of items;
for each item, automatically mine a plurality of websites to retrieve a plurality of instances of unstructured user entered textual descriptions corresponding to each item;
for each item, extract a plurality of candidate attribute values from the corresponding user entered textual descriptions;
rank the candidate attribute values according to how selection of each candidate attribute value will reduce a size of a search result set;
wherein ranking the candidate attribute values further comprises computing a degree of discrimination for each of a plurality of attribute values, the degree of discrimination for each attribute value corresponding to the number of items that would be excluded from the search result set when the search result set is limited to items having the corresponding attribute value;
for each item, generate a reduced set of candidate attribute values by applying a classifier to filter out one or more ranked candidate attribute values that are unlikely to reduce the size of the search result set by determining, for each candidate attribute value, whether an answer to a question formulated from each candidate attribute value is likely to reduce the size of the search result set;
in response to a search query, return a query result set comprising a subset of items from the database;
apply a top ranked one of the reduced set of candidate attribute values corresponding to the items of the query result set to automatically formulate and present a question relating to the top ranked candidate attribute value such that any response to that question will reduce a size of the query result set returned in response to the search query; and
wherein the presented question is a request for a value of an attribute.

11. The system of claim 10, further comprising, for each item in the database, performing an automated search of a plurality of websites to retrieve the user entered textual descriptions.

12. The system of claim 11, further comprising receiving one or more of the user entered textual descriptions via a direct user input.

13. The system of claim 10, further comprising applying the classifier to determine whether each of the candidate attribute values is answerable if used to formulate the presented question.

14. The system of claim 10, further comprising a plurality of pre-defined question templates that are applied to formulate the presented question by inserting a selected candidate attribute value into a selected one of those templates.

15. A computer-readable memory having computer executable instructions stored therein, said instructions causing a computing device to execute a method comprising:
receiving a database comprising a plurality of items;
for each item, automatically mining a plurality of websites to retrieve a plurality of instances of unstructured user entered textual descriptions corresponding to each item;
for each item, extracting a plurality of candidate attribute values from the corresponding user entered textual descriptions;
for each item, generating a reduced set of candidate attribute values by applying a classifier to filter out one or more candidate attribute values that are unlikely to reduce the size of a search result set by determining, for each candidate attribute value, whether an answer to a question formulated from each candidate attribute value is likely to reduce the size of the search result set;
for each item, ranking each attribute value in the corresponding reduced set of candidate attribute values according to how selection of each candidate attribute value will reduce the size of the search result set;
wherein ranking the candidate attribute values further comprises computing a degree of discrimination for each of a plurality of attribute values, the degree of discrimination for each attribute value corresponding to the number of items that would be excluded from the search result set when the search result set is limited to items having the corresponding attribute value;
in response to a search query, returning a query result set comprising a subset of items from the database;
applying one or more of the reduced sets of candidate attribute values corresponding to the items of the query result set to automatically formulate and present a question based on the ranking of the candidate attribute values such that any response to that question will reduce a size of the query result set returned in response to the search query; and
wherein the presented question is a request for a value of an attribute.

16. The computer-readable memory of claim 15 wherein generating the reduced set of candidate attribute values further comprises, applying a classifier to determine whether each of the candidate attribute values is answerable if used to formulate the question.

17. The computer-readable memory of claim 16, further comprising limiting the use of candidate attribute values for formulating the question to answerable attribute values.

* * * * *